United States Patent [19]

Cabestany et al.

[11] 4,396,752

[45] Aug. 2, 1983

[54] STRONG CATIONIC POLYELECTROLYTES IN POWDER FORM BASED ON ACRYLAMIDE AND QUATERNIZED OR SALIFIED DIMETHYLAMINOETHYL ACRYLATE FOR FLOCCULATION OF SOLID MATERIAL SUSPENSIONS AND COALESCENCE OF EMULSIONS

[75] Inventors: Jean Cabestany, Stains; Claude Trouve, Paris; Dominique Depernet, Stains, all of France

[73] Assignee: Societe Francaise Hoechst, France

[21] Appl. No.: 213,695

[22] Filed: Dec. 5, 1980

Related U.S. Application Data

[63] Continuation-in-part of Ser. No. 905,609, May 12, 1978.

[30] Foreign Application Priority Data

May 16, 1977 [FR] France ............................... 77 14994
Dec. 14, 1979 [FR] France ............................... 79 30711

[51] Int. Cl.$^3$ .................. C08F 267/10; C08F 222/38; C08F 2/16; C08F 6/14
[52] U.S. Cl. .............................. 526/287; 526/206; 526/207; 526/923; 526/312; 526/292.2; 528/493; 528/501; 524/547; 524/555; 210/734
[58] Field of Search ............... 260/29.6 WQ, 29.6 SQ, 260/29.6 H; 526/68, 71, 206, 207, 287, 292, 292.2, 923, 312; 528/501, 493

[56] References Cited

U.S. PATENT DOCUMENTS

| | | | |
|---|---|---|---|
| 4,165,419 | 8/1979 | Suzuki et al. | 526/292.2 |
| 4,190,717 | 2/1980 | Suzuki et al. | 526/62 |
| 4,224,150 | 9/1980 | Buriks et al. | 526/292.2 |

FOREIGN PATENT DOCUMENTS

| | | |
|---|---|---|
| 2295049 | 7/1976 | France . |
| 2390983 | 12/1978 | France . |
| 1388399 | 3/1975 | United Kingdom . |
| 1399129 | 6/1975 | United Kingdom . |

OTHER PUBLICATIONS

Derwent Abst. 82148 A/46 Hoechst (BE867009) (11-1-3-78), "Powdered Cationic Polyelectrolytes, . . . " Equiv. to above FR2390983.

Primary Examiner—Melvyn I. Marquis
Assistant Examiner—Herbert J. Lilling
Attorney, Agent, or Firm—Karl W. Flocks; Sheridan Neimark

[57] ABSTRACT

Strong cationic polyelectrolytes in powder form based on acrylamide and quaternized or salified dimethylaminoethyl acrylate; and the use thereof for flocculation of solid material suspensions and coalescence of emulsions.

Such polyelectrolytes contain in molar proportions more than 50% of cationic units uniformly distributed along the copolymer chains. They are used for flocculating colloidal suspensions and/or coalescing emulsions, especially, in sewage water purification installations.

4 Claims, No Drawings

STRONG CATIONIC POLYELECTROLYTES IN POWDER FORM BASED ON ACRYLAMIDE AND QUATERNIZED OR SALIFIED DIMETHYLAMINOETHYL ACRYLATE FOR FLOCCULATION OF SOLID MATERIAL SUSPENSIONS AND COALESCENCE OF EMULSIONS

This is a continuation-in-part of Parent co-pending application Ser. No. 905,609 filed May 12, 1978.

The invention relates to strong cationic polyelectrolytes in powder form, based on acrylamide and quaternized or salified dimethylaminoethyl acrylate and the use thereof for the flocculation of solid material suspensions and the coalescence of the emulsions.

For many years back, cationic polyelectrolytes have been used in the sphere of action against pollution, to dehydrate sludges in residual waters from purification stations.

Among them, copolymers of acrylamide and of cationic monomers having a high molecular weight are very much recommended. The parent co-pending application Ser. No. 905,609 describes water-soluble cationic polyelectrolytes in powder form, based on acrylamide and quaternized or salified dimethylaminoethyl acrylate, containing in molar proportions 10 to 50% of cationic units distributed regularly along the copolymer chains and simultaneously having intrinsic viscosity higher than 6 dl/g measured at 30° C., in a molar solution of sodium chloride and a measured cationicity higher than 90% of the theorical cationicity, for flocculation of municipal sludges.

However, for the coalescence of the emulsions and/or flocculation of very colloidal hydrophilic suspensions with high proportion of volatile materials and/or high Z potential, such as certain organic, mineral, biological sludges, stabilized or digested, such polyelectrolytes are not fully satisfactory.

It has now been found that strong water-soluble cationic polyelectrolytes in powder form, comprising copolymers of acrylamide and quaternized or salified dimethylaminoethyl acrylate, containing in molar proportions 50 to 99% of cationic units regularly distributed along the copolymer chains, simultaneously having intrinsic viscosity higher than 6 dl/g measured in a molar solution of sodium chloride at 25° C. or at 30° C. and a measured cationicity higher than 94% of the theoretical cationicity, are particularly suited for the flocculation of such colloidal sludges with a high concentration of volatile materials and, more generally, flocculation of colloidal suspensions and the coalescence of the emulsions.

The application of the copolymers according to the invention having a high charge density, for example, to the dehydration of municipal and/or industrial sludges results in reduction of the quantity of use thereof, whilst securing satisfactory and regular functioning of the installations: the cake does not clog up, is of a proper volume and dryness, and thus can be easily handled, suitable flow rates of sludges enabling correct amortization of installations, centrifugation yields always higher than 98% for installations equipped with continuously working decanters, clear filtrates containing always less than 1 gram per liter, of dry materials in installations provided with conveyor belt filters.

The reactivity ratios $r_1$ and $r_2$ were determined for the following monomer pairs: acrylamide-dimethylaminoethyl acrylate salified by hydrochloric acid (AAM-CHA); acrylamide-dimethylaminoethyl acrylate quaternized by methyl chloride (AAM-CMA); acrylamide-dimethylaminoethyl methacrylate quaternized by methyl chloride (AAM-CMM). The following values were obtained:

TABLE I

| Monomer pairs | Reactivity ratios | |
|---|---|---|
| | $r_1$ | $r_2$ |
| AAM-CHA | 0.80 | 0.55 |
| AAM-CMA | 0.72 | 0.66 |
| AAM-CMM | 0.20 | 1.75 |

The reactivity ratios were determined either by the method of A. J. YEZRIELEV et al., Vysokomol. Soedineniya, 1969, 11 (8), 1670, or the method of T. KELEN et al., J. Polymer. Sci., 1977, 15, 3047–3074.

Such reactivity ratios result in favourable incorporation and composition curves for copolymers based on quaternized or salified dimethylaminoethyl acrylate, hence leading to homogeneous distribution of the cationic units along the copolymer chains. Table II shows the percentage of copolymers with a composition to ±10% of the desired one, as a function of the molar percentages of cationic monomer present in the copolymer.

TABLE II

| Molar % of cationic monomer | % of copolymers having a composition to ± 10% of desired composition | | |
|---|---|---|---|
| | AAM-CMA | AAM-CHA | AAM-CMM |
| 30 | 99 | 99.8 | 8 |
| 50 | 89 | 91 | 15.7 |
| 70 | 61.6 | 86.2 | 36.9 |
| 80 | 98.9 | | 22.9 |
| 90 | 96.4 | 98.6 | 94.4 |

Therefore, it can be noted in the case of AAM-CMA and AAM-CHA pairs that the copolymer composition differs less from the initial composition of the monomer mixture than in the case of the AAM-CMM pair. Thus, the copolymers obtained from the AAM-CHA and AAM-CMA pairs have more regular cationic unit distribution than those obtained from the AAM-CMM pair.

If the coefficients e and Q, determining the polarity of the ethylenic bond and the monomer reactivity, respectively, from the reactivity ratios, are calculated according to T. ALFREY and C. PRICE, J. Polymer. Sci. 1947, 2, 101, the following values thereof are obtained:

TABLE III

| Monomers | Q | e |
|---|---|---|
| AAM | 1.120 | 0.190 |
| CHA | 1.663 | 1.096 |
| CMA | 1.907 | 1.262 |
| CMM | 6.804 | 1.215 |

The high value of the coefficient Q shows that the monomer reactivity, i.e. its tendency to admix with a radical is high. However, radicals corresponding to monomers derived from the methacrylic acid are tertiary, hence more stable than those issued from the derivatives of the acrylic acid; eventually, a lower reactivity is obtained.

The copolymers according to the invention simultaneously possess intrinsic viscosity always higher than 6 dl/g, determined in accordance with the usual methods at 25° C. or 30° C., in a molar solution of sodium chloride, and a measured cationicity higher than 94% of the theoretical cationicity, whereas, as can be seen hereinbelow, copolymers corresponding to the acrylamide-quaternized or salified dimethylaminoethyl acrylate pairs do not simultaneously have both properties.

The theoretical cationicity of a copolymer is the number of cationic milliequivalents theoretically present per gram of copolymer.

For a copolymer of x % moles of acrylamide having a molecular weight A and y % moles of cationic monomer having a molecular weight B, i.e. a copolymer of which the average molecular weight M of a unit is given by the relationship:

$$\overline{M} = \frac{xA + yB}{100},$$

the theoretical cationicity results from the formula:

$$C_t = \frac{10 \, y}{M}.$$

The measured cationicity of copolymers of the invention is determined in accordance with a method derived from the one described in: "Mise au point de chimie analytique, organique, pharmaceutique et bromatologie" J. A. GAUTIER and P. MALANGEAU, 17th series, page 83-Masson et Cie, Editors, Paris-, consisting of determining the cationic units by means of an aqueous solution 0.004 M of an anionic surfactant, sodium dioctylsulfosuccinate in buffered water-chloroform medium, in the presence of methyl yellow. The measured cationicity is expressed in milliequivalents per gram.

It is observed that the copolymers according to the invention have a measured cationicity always very close to the theoretical cationicity, whereas the corresponding copolymers, with methacrylates instead of acrylates have measured cationicities close to the theoretical cationicities, only with copolymers having a high concentration of cationic units. A measured cationicity close to the theoretical cationicity denotes proper distribution of cationic units along the chains; as a matter of fact, when cationic units are grouped instead of being regularly distributed, the chains tend to form clusters in which cationic units are not reached by the dosage reactives and do not correctly play their part.

Table IV shows the values of intrinsic viscosity ($\eta$) expressed in dl/g, of the theoretical cationicity and the measured cationicity, expressed in cationic milliequivalents present per gram of homo- or copolymer, for a certain number of cationic homopolymers derived from the following monomers: CHA, CMA, CMM, CHM and cationic copolymers derived from said monomers with AAM (acrylamide).

TABLE IV

| Cationic monomer | Molar % of cationic monomer | Theoretical cationicity $C_t$ | Measured cationicity $C_m$ | $\frac{C_m}{C_t}$ in % | $(\eta) \frac{dl}{g}$ |
|---|---|---|---|---|---|
| MSM* | 50 | 2.82 | 2.75 | 97% | smaller than 6 |
| CMM | 100 | 4.81 | 4.8 | 100% | 4 |
| CMA | 100 | | 5.1 | 99% | 9.1 |
| CHA | 70 | | 4.5 | 94.5% | 14.5 |
| CHA | 100 | | 5.4 | 96.9% | 10.2 |

TABLE IV-continued

| Cationic monomer | Molar % of cationic monomer | Theoretical cationicity $C_t$ | Measured cationicity $C_m$ | $\frac{C_m}{C_t}$ in % | $(\eta) \frac{dl}{g}$ |
|---|---|---|---|---|---|
| CHM** | 100 | 5.16 | 4.9 | 95% | 4.8 |

*MSM: dimethyl aminoethyl methacrylate quaternized by dimethyl sulphate.
**CHM: dimethyl aminoethyl methacrylate salified with HCl.

There was experimentally determined the dose of use K/T, expressed in kilograms of copolymer per ton of dry materials contained in sludges to obtain regular and satisfactory operation of the installations, without cake clogging or sticking to the conveyor belt filters, for sludges of various origins: municipal, industrial and pretreated according to different methods: digested, stabilized, biological sludges, having variable dry material concentrations, $M_S$, and ratios of volatile materials to dry materials, $M_v/M_S$, expressed in percent comprised between 50 to 85%.

The concentrationn of dry materials ($M_s$) of a sludge is determined by drying it at 105° C., at a constant weight, and is expressed in grams per 100 grams of sludge.

The content of volatile materials in a sludge, $M_v$, is determined by gaseification of the sludge in an oven at 575±25° C.; it is expressed in grams.

Biological sludges are hydrophilic organic sludges derived from prolonged aeration of sewage waters, of industrial and/or municipal origins: waters from breweries, dairies, petro-chemical industries, . . .

Stabilized sludges are hydrophilic organic sludges, mainly derived from purification stations treating municipal residual waters submitted to aerobic digestion, i.e., mineralized.

Digested sludges are hydrophilic organic sludges, mainly derived from purification stations treating municipal residual waters submitted to anaerobic digestion.

Table V contains experimental data on results obtained either with copolymers according to the invention, or, for comparison purposes, with copolymers described in the parent co-pending application, or with homopolymers of dimethylaminoethyl methacrylate quaternized by methyl chloride (CMM), or finally with homopolymers of dimethylaminoethyl acrylate quaternized by methyl chloride (CMA).

TABLE V

| Sludge type | Biological sludges | Stabilized sludges | | Digested sludges | $C_m/C_t^{(2)}$ |
|---|---|---|---|---|---|
| Sludge origin | Food industry | Muni-cipal A | Muni-cipal B | Muni-cipal D | |
| Dry materials $M_s$ (gr/100 gr sludge) | 2.6 | 2.4 | 2.55 | 4.4 | |
| $\frac{M_v}{M_s}$ | 84.5% | 74.7% | 71.8% | 53% | |
| Dose of use | K/T | K/T | K/T | K/T | |
| Polymer type | | | | | |
| 100% CMA | | 2.5 | 3.5 | 3.4 | 99 |
| 80% CMA-20% AAM | | 2.65 | 3.25 | 2.5 | >94 |
| 70% CMA-30% AAM | .5 | 2.25 | 3 | 2.6 | 94.5 |
| 60% CMA-40% AAM | | 2.5 | 3.25 | 2.4 | >94 |
| 50% CMA-50% AAM | | 3 | 3.25 | 2.1 | >90 |

TABLE V-continued

| | | | | |
|---|---|---|---|---|
| 30% CMA-70% AAM | | 2.75[1] | 3.25[1] | >90 |
| 100% CMM | 6 | 2.9[1] | 3.4    4.8 | 100 |

[1]Cake sticking to cloth.
[2]Measured cationicity/theoretical cationicity ratio expressed in %.

Table V shows clear superiority of the copolymers according to the invention for dehydration of sludges having high concentration of volatile materials: municipal station A. The use of the copolymers according to the invention containing in molar proportions more than 50% cationic monomers prevents any clogging effects in the conveyor belt filters and facilitates detachment of cake, of suitable siccity and volume. In particular, the copolymer containing in molar proportions 70% CMA and 30% AAM is especially suited to that type of sludges with a high concentration of volatile materials.

Table VI shows the parameters of operation of a purification station treating municipal sewage waters, containing organic, stabilized sludges having a proportion of dry materials of 2.04% and a ratio of volatile materials to dry materials, $M_v/M_s$, of 60%, and working with a 70-30 CHA-AAM copolymer, as the sludge dehydration agent. The station is equipped with a double belt filter the conveying speed of which was determined to 1 meter per minute.

TABLE VI

| | | | | Flocculation | | |
|---|---|---|---|---|---|---|
| Flow rate $m^3/h$ | Feed $M_s$ g/100 g | Flow rate kg $M_s/h$ | Flocculant type | Flocculant flow rate g/h | Dose of use K/T | Extracted solid in g of $M_s$ per 100 g of cake |
| 11.35 | 16.9 | 191 | 70% CHA-30% AAM | 322 | 1.7 | 13.3 |
| 15.77 | 16.9 | 266 | 70% CHA-30% AAM | 522 | 1.95 | 13.5 |
| 11.35 | 20.4 | 232 | 100% CHM | 733.7 | 3.2 | 13.6 |

According to table VI, to obtain a cake having the same siccity, 13.5±0.2 g of dry materials per 100 g of cake, the dose of use K/T of polyelectrolytes, expressed in Kg/ton of dry materials contained in the sludge, is much less with the polyelectrolytes 70-CHA-30-AAM according to the invention.

As known, the esters of acrylic acid, generally, dimethylaminoethyl acrylate, in particular, are much more easily hydrolyzable than corresponding esters of methacrylic acid. By merely dissolving those products in water, thereby obtaining a solution of pH 11, it can be observed that at 20° C., dimethylaminoethyl methacrylate hydrolyzes very little, i.e. 6% in 30 minutes, whereas in the same period of time 50% of dimethylaminoethyl acrylate are hydrolyzed. At pH 5.5-6, hydrolysis of dimethylamino ethyl acrylate is lower, in one hour it is of 0.8% at 40° C. and 3.8% at 60%, but it is still 4 to 5 times quicker than that of the corresponding ester of methacrylic acid.

Similar results are cited in the literature relative to hydrolysis of polymers of acrylic and methacrylic acids and acid esters. Thus, in the KIRK-OTHMER encyclopedia, second edition, volume 13, page 344, there are mentioned, among other works, those of G. SMETS et al., J. Polymer. Sci., 1959, 41, 375-80, showing that methyl methacrylate polymers are much more resistant to hydrolysis than methyl acrylate polymers, and that those differences in comportment are rather large, since the latter are hydrolyzed in 30 minutes, with a yield of 98.7%, whereas the former are hydrolyzed to only 11% in 16 hours.

It is also known that polymerization of the derivatives of acrylic acid is highly exothermic; the polymerization heat of acrylamide is, for example, 19.8±0.7 Kcal/mole (French Pat. No. 2,246,573). The question is therefore of being able to control the polymerization of quaternized or salified dimethylaminoethyl acrylate, particularly, in order to obtain copolymers in powder form, without degradation of the cationic chain.

In the prior art various solutions have been proposed to remedy this problem. U.S. Pat. No. 4,138,539 describes a method of continuous polymerization involving a movable polymerization zone, but this method demands large investments in equipment, which cannot be exploited with profit in other productions, as would be the case with conventional, polyvalent material.

Another difficulty encountered is obtaining polyelectrolytes according to the invention, in powder form, containing as little water as possible and not requiring any subsequent crushing, producing dust and fines, very annoying to users.

In the prior art, it was known to prepare relatively easily copolymers of acrylamide and quaternized or salified dimethylaminoethyl acrylate in solution in water, by achieving the copolymerization at the proper pH; but even at low concentrations, gels are produced, which are practically impossible to convert to powder form. However, for industrial use, the polyelectrolytes must preferably be in the form of a powder, which is more easily transportable at lesser costs than aqueous solutions.

Polyelectrolytes according to the invention can be obtained by any appropriate method. For example, according to an advantageous method of manufacturing, acrylamide and quaternized or salified dimethylaminoethyl acrylate are copolymerized with the required proportions, in water-in oil inverted emulsion (i.e. in water, in the presence of a water-immiscible organic solvent and an initiator), at pH comprised between 3 to 6, preferably, 4.5 to 6; then, it is dehydrated at a temperature lower than 80° C. so as to avoid any hydrolytic process. The dehydration can be achieved either by azeotropic distillation of water with the solvent used during polymerization, if the latter is proper, or by decantation, filtration, washing with a water-miscible solvent, such as acetone, and drying of the polymer in a fluidized bed, at a temperature lower than 75° C.

The organic solvent used is an aliphatic or cyclanic hydrocarbon such as heptane, mixtures of branched $C_{10}$ to $C_{11}$ aliphatic hydrocarbons or cyclohexane.

Heptane and cyclohexane are elected as enabling azeotropic dehydration of the copolymer. The concentration of monomers in the aqueous phase can vary from 40 to 70%, and as mentioned above, the monomer mixture may contain from 50 to 99% of cationic monomer, expressed in moles.

The initiator used can be any conventional initiator system, for example, photo-initiators, in the presence of light, azo compounds, peroxides, organic hydroperoxide (benzoyl peroxide, cumene peroxide) and the alkali persulfates, alone or admixed, with, as the activators, tertiary amines (dimethylparatoluidine, triethanolamine), orgaic salts and complexes of transition metals (cobalt II cotoate, iron III acetyl acetonate) sulfites, thiosulfates and alkali metabisulfites, and the like.

The emulsifiers used are naturally those of low HLB (hydrophilic-lipophilic balance), preferably the fatty esters of sorbitan, for example, sorbitan mono-oleate.

The following examples are given merely by way of explanation and are not limitative, for the obtention of the products according to the invention.

EXAMPLE 1

30/70 AAM/CMA Copolymer

There is introduced into a 2 liter-reactor a solution of 4 g of sorbitan mono-oleate in 468 g of cyclohexane, then, after bleeding off air, by nitrogen, there is introduced under nitrogen with stirring, a solution of 172.8 g (0.89 mole) of dimethylaminoethyl acrylate quaternized by methyl chloride (CMA) and 27.2 g (0.38 mole) of acrylamide (AAM), in 200 g of water, having pH adjusted to 4.5, by adding diluted sulfuric acid.

Thereafter, there is introduced, with stirring in nitrogen atmosphere, a solution of 0.043 g of 70% cumene hydroperoxide in 12 g of cyclohexane, then, several minutes later there is introduced dropwise a solution of 0.04 g of sodium metabisulfite in 10 g of water. The copolymerization reaction starts immediately; the reaction temperature reaches 70°-75° C. in 5-10 minutes. After one hour of stirring at the boiling point, water is removed by azeotropic distillation up to a proportion of residual water of 15%. Thereafter, the reaction medium, cooled to the room temperature is filtered, then the filtrate is washed with cyclohexane (170 ml) and finally is dried in a fluidized bed at 95° C. for 40 minutes. Thus, there is isolated a 30-70 AAM-CMA copolymer in powder form with 97% of dry extract, entirely soluble in water and having an intrinsic viscosity, measured at 25° C., in a molar solution of sodium chloride, of 8.5 dl/g and a measured cationicity of 4.2 meq./g, i.e. 94.5% of the theoretical cationicity.

EXAMPLES 2-3

20/80 and 40/60 AAM-CMA copolymers

The procedure of example 1 was followed, but either with 0.95 mole of dimethylaminoethyl acrylate quaternized by methyl chloride (CMA) and 0.24 mole of acrylamide (AAM), or with 0.83 mole of CMA and mole of AAM. AAM-CMA copolymers are thus obtained, containing in molar proportions either 80% CMA and 20% AAM, or 60% CMA and 40% AAM. Such copolymers have a measured cationicity higher than 94% of the theoretical cationicity.

EXAMPLE 4

30/70 AAM-CHA

The procedure of example 1 was followed, but with 0.95 mole of hydrochloride of dimethylaminoethyl acrylate and 0.41 mole of acrylamide, and if required, by adjusting the pH of the solution to pH=4.5, by diluted hydrochloric acid or diluted ammonia.

Thus, a powder form 30/70 AAM-CHA copolymer is isolated, having intrinsic viscosity of 8.8 dl/g measured at 25° C., in a molar solution of sodium chloride, and a measured cationicity of 94.5% of the theoretical cationicity.

Products such as those resulting from the above examples have shown efficiency in the contemplated applications, as results from the above tables V and VI.

Satisfactory results have also been obtained therewith when applied for the coalescence of emulsions such as industrial fluids based on petroleum-derived products, emulsions from the exploitation of subterranean sheets, and the like.

We claim:

1. Cationic polyelectrolyte in water-soluble powder form, applicable to the coalescence emulsions and/or flocculation of very colloidal hydrophilic suspensions of the organic, mineral, biological, stabilized or digested sludge type with a proportion of volatile materials determined by gaseification of said sludge to be treated in an oven at 575±25° C. as expressed in grams per 100 grams of dry materials contained in said sludge higher than or equal to 50%, said polyelectrolyte comprising a mixture of copolymers of acrylamide and of a cationic monomer of quaternised or salified dimethylaminoethyl acrylate said mixture of copolymers consisting essentially of copolymers each containing in molar proportions at least 60% of cationic units spaced regularly along its copolymer chain; said mixture of copolymers having an intrinsic viscosity higher than 6 dl/g measured at 25° C. or at 30° C. in a molar solution of NaCl and a measured cationicity higher than 94% of the theoretical cationicity.

2. Cationic polyelectrolyte in water-soluble powder form, applicable to the coalescence and/or flocculation of very colloidal hydrophilic suspensions of the organic, mineral, biological, stabilized or digested sludge type with a proportion of volatile materials determined by gaseification of said sludge to be treated in an oven at 575±25° C. as expressed in grams per 100 grams of dry materials contained in said sludge higher than or equal to 50%, said polyelectrolyte comprising a mixture of emulsion polymerized copolymers of acrylamide and of a cationic monomer of quaternised or salified dimethylaminoethyl acrylate, said mixture of copolymers consisting essentially of copolymers each containing in molar proportions at least 60% of cationic units spaced regularly along its copolymer chain, said mixture of copolymers having an intrinsic viscosity higher than 6 dl/g measured at 25° C. or at 30° C. in a molar solution of NaCl and a measured cationicity higher than 94% of the theoretical cationicity.

3. Cationic polyelectrolyte in water-soluble powder form according to claim 1 applicable at the rate of 1 to 5 kg/ton of dry materials to be treated.

4. Cationic polyelectrolyte in water-soluble powder form according to claim 2 applicable at the rate of 1 to 5 kg/ton of dry materials to be treated.

* * * * *